US011214246B2

United States Patent
Doi et al.

(10) Patent No.: US 11,214,246 B2
(45) Date of Patent: Jan. 4, 2022

(54) DRIVING ASSISTANCE APPARATUS (71) Applicant: Toyota Jidosha Kabushiki Kaisha, Toyota (JP)

(72) Inventors: Tomoyuki Doi, Gotemba (JP); Kazuyuki Fujita, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 135 days.

(21) Appl. No.: 16/827,930

(22) Filed: Mar. 24, 2020

(65) Prior Publication Data

US 2020/0307572 A1 Oct. 1, 2020

(30) Foreign Application Priority Data

Mar. 27, 2019 (JP) .............................. JP2019-060699

(51) Int. Cl.
  B60W 30/09 (2012.01)
  B60W 10/18 (2012.01)
  B60W 10/20 (2006.01)
(52) U.S. Cl.
  CPC ............ B60W 30/09 (2013.01); B60W 10/18 (2013.01); B60W 10/20 (2013.01)
(58) Field of Classification Search
  CPC ...... B60W 30/09; B60W 10/18; B60W 10/20; B60W 2720/106; B60W 2554/40; B60W 2050/0091; B60W 2552/53; B60W 2555/60; B60W 2552/30; B60W 30/18109; B60W 30/0956; B60W 50/0097
  See application file for complete search history.

(56) References Cited

U.S. PATENT DOCUMENTS

| 9,487,195 | B2 * | 11/2016 | Fujishiro | B60T 7/22 |
| 9,922,564 | B2 * | 3/2018 | Bai | B60K 35/00 |
| 10,358,128 | B2 * | 7/2019 | Yoneda | B60W 30/0956 |
| 10,967,857 | B2 * | 4/2021 | Matsunaga | B60W 30/095 |
| 2017/0225614 | A1 * | 8/2017 | Park | B60W 50/14 |
| 2017/0327110 | A1 | 11/2017 | Inoue et al. | |

FOREIGN PATENT DOCUMENTS

JP  2017-206040 A  11/2017

* cited by examiner

Primary Examiner — Jason Holloway
(74) Attorney, Agent, or Firm — Dinsmore & Shohl LLP (57) ABSTRACT A driving assistance apparatus includes: an assistor configured to perform an avoidance assistance control when there is a target to avoid, ahead of a vehicle, to avoid a collision between the vehicle and the target; a predictor configured to predict that a deceleration operation of the vehicle will be performed, on the basis of a deceleration factor, which is different from the target and which is located in surroundings of the vehicle, when there is the target ahead of the vehicle; and a changer configured in such a manner that when it is predicted that the deceleration operation will be performed, the changer performs at least one of a process of reducing an assistance amount associated with the avoidance assistance control and a process of delaying start timing of the avoidance assistance control, in comparison with those when it is not predicted that the deceleration operation will be performed.

2 Claims, 7 Drawing Sheets

FIG. 7

DRIVING ASSISTANCE APPARATUS

CROSS-REFERENCE TO RELATED APPLICATIONS

This application is based upon and claims the benefit of priority of the prior Japanese Patent Application No. 2019-060699, filed on Mar. 27, 2019, the entire contents of which are incorporated herein by reference.

BACKGROUND

1. Technical Field

Embodiments of the present disclosure relate to a driving assistance apparatus configured to provide driving assistance for a vehicle.

2. Description of the Related Art

For this type of apparatus, there is known an apparatus configured to perform a control (hereinafter referred to as an "avoidance assistance control" as occasion demands) for avoiding a collision between a vehicle and an obstacle, which is located ahead of the vehicle. For example, Japanese Patent Application Laid Open No. 2017-206040 (Patent Literature 1) discloses a technology/technique of performing a control of assisting in steering a host vehicle if it is determined that there is a risk of a collision between the host vehicle and an obstacle.

In the technology/technique described in the Patent Literature 1, the avoidance assistance control is performed on the basis of information about a target to avoid (e.g., a pedestrian, etc.). However, when a deceleration factor other than the target to avoid (e.g., a stop line, etc.) is located near the target to avoid, a deceleration control caused by the deceleration factor may be performed apart from the avoidance assistance control.

For example, supposedly, another system that is different from an apparatus that performs the avoidance assistance control may automatically decelerate a vehicle, due to the deceleration factor. In this case, the vehicle is likely decelerated by the deceleration control, which is different from the avoidance assistance control, and there is room for improvement in arbitrating between the avoidance assistance control and the deceleration control. Moreover, the avoidance assistance control is performed as usual in a situation in which the vehicle is decelerated by the deceleration control, which is different from the avoidance assistance control. Thus, a driver of the vehicle may feel discomfort in some cases.

Alternatively, for example, supposedly, the driver may perform a deceleration operation of decelerating the vehicle, due to the deceleration factor. In this case, although a risk of a collision between the target to avoid and the vehicle is reduced by the driver decelerating the vehicle (or although the driver understands that the risk is reduced), the avoidance assistance control is performed as usual without consideration of the reduced risk. Therefore, the driver may feel discomfort.

SUMMARY

In view of the problems described above, it is therefore an object of embodiments of the present disclosure to provide a driving assistance apparatus configured to prevent a driver from feeling discomfort due to the avoidance assistance control.

An aspect of a driving assistance apparatus according to the present disclosure is provided with: an assistor configured to perform an avoidance assistance control when there is a target to avoid, ahead of a vehicle, so as to avoid a collision between the vehicle and the target; a predictor configured to predict that a deceleration operation of the vehicle will be performed, on the basis of a deceleration factor, which is different from the target and which is located in surroundings of the vehicle, when there is the target ahead of the vehicle; and a changer configured in such a manner that when it is predicted that the deceleration operation will be performed, the changer performs at least one of a process of reducing an assistance amount associated with the avoidance assistance control and a process of delaying start timing of the avoidance assistance control, in comparison with those when it is not predicted that the deceleration operation will be performed.

DETAILED DESCRIPTION OF THE EMBODIMENT

Hereinafter, a driving assistance apparatus according to an embodiment of the present disclosure will be explained with reference to the drawings.

<Configuration of Apparatus>

Figure 1:
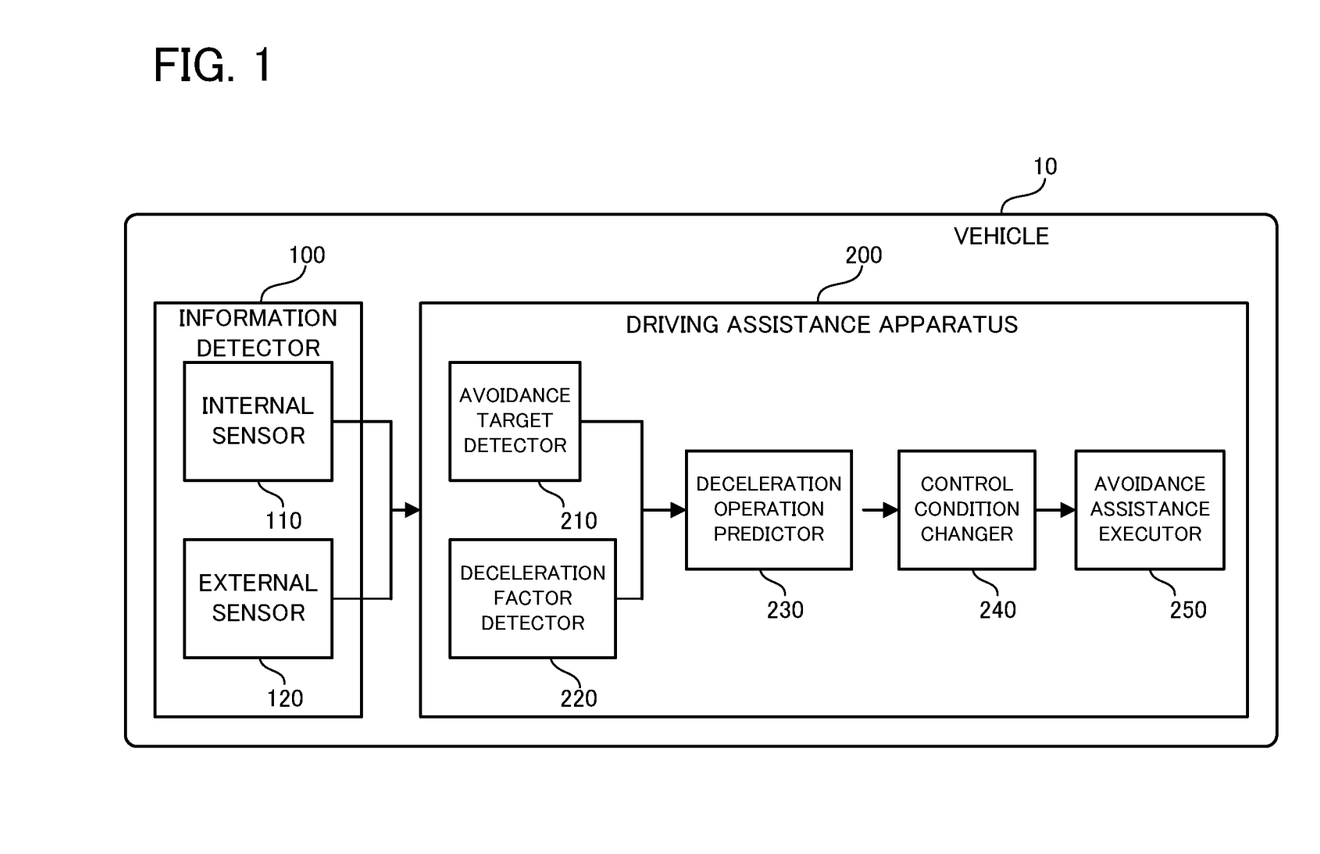
FIG. 1 is a block diagram illustrating a configuration of a vehicle according to an embodiment.

Firstly, an entire configuration of a vehicle on which the driving assistance apparatus according to the embodiment is mounted will be explained with reference to FIG. 1. FIG. 1 is a block diagram illustrating the configuration of the vehicle according to the embodiment.

As illustrated in FIG. 1, a vehicle 10 according to the embodiment is provided with an information detector 100 and a driving assistance apparatus 200.

The information detector 100 is provided with an internal sensor 110 and an external sensor 120. The internal sensor 110 may include, for example, a vehicle speed sensor, an acceleration sensor, a yaw rate sensor, a steering sensor, or the like, and is configured to detect an internal parameter of the vehicle 10. The external sensor 120 may include, for example, an on-vehicle camera, a radar, a Lidar, or the like, and is configured to detect information about an object (e.g., a pedestrian, a bicycle, etc.), a road sign (e.g., a stop sign), a road shape (e.g., a curve), or the like that are in a predetermined range (in other words, in a detectable range of the external sensor 120) near the vehicle 10. Each of information detected by the internal sensor 110 and the external sensor 120 may be outputted to the driving assistance apparatus 200.

The driving assistance apparatus 200 is configured to perform a deceleration control and a steering control (which are specifically an automatic deceleration control and an automatic steering control, which are independent of an operation by an occupant), as an avoidance assistance control for avoiding a collision between the vehicle 10 and an object that is located ahead of the vehicle 10. The driving assistance apparatus 200 is configured, for example, as an electronic control unit (ECU) mounted on the vehicle 10, and is provided with an avoidance target detector 210, a deceleration factor detector 220, a deceleration operation predictor 230, a control condition changer 240, and an avoidance assistance executor 250, as logical processing blocks or physical processing circuits for realizing its functions.

The avoidance target detector 210 is configured to detect an avoidance target, which is located ahead of the vehicle 10, on the basis of the information detected by the information detector 100 (in other words, the internal sensor 110 and the external sensor 120). The "avoidance target" herein may be a target on which the deceleration control and the steering control are to be performed so as to avoid a collision, and may include, for example, a pedestrian who is ahead of the vehicle 10, or the like. A detailed explanation of a specific method of detecting the avoidance target will be omitted herein because the existing technologies/techniques can be applied, as occasion demands. Information about the avoidance target detected by the avoidance target detector 210 may be outputted to the deceleration operation predictor 230.

The deceleration factor detector 220 is configured to detect a deceleration factor, which is different from the avoidance target detected by the avoidance target detector 210 (i.e., something that could cause the vehicle 10 to decelerate, other than the avoidance target). The deceleration factor may include, for example, a stop sign, a traffic light, a railroad crossing, a curve ahead, the end of a T-junction, and the like. A detailed explanation of a specific method of detecting the deceleration factor will be omitted herein because the existing technologies/techniques can be applied, as occasion demands. Information about the deceleration factor detected by the deceleration factor detector 220 may be outputted to the deceleration operation predictor 230.

The deceleration operation predictor 230 is configured to predict (or determine) whether or not a deceleration operation will be performed by a driver of the vehicle 10, due to the presence of the deceleration factor detected by the deceleration factor detector 220. In other words, the deceleration operation predictor 230 is configured to predict whether or not a deceleration operation will be performed by a driver of the vehicle 10, due to a factor that is different from the avoidance target detected by the avoidance target detector 210. The deceleration operation predictor 230 may predict whether or not the deceleration operation of the vehicle 10 will be performed, for example, on the basis of information about the avoidance target detected by the avoidance target detector 210 and the deceleration factor detected by the deceleration factor detector 220 (e.g., a relative position relation, etc.). A specific prediction method performed by the deceleration operation predictor 230 will be explained in detail later. A prediction result of the deceleration operation predictor 230 may be outputted to the control condition changer 240. The deceleration operation predictor 230 is a specific example of the "predictor" in Supplementary Notes described later.

The control condition changer 240 is configured to change at least one of an assistance amount (e.g., a deceleration amount or a steering amount) and start timing associated with the avoidance assistance control, on the basis of the prediction result of the deceleration operation predictor 230. A specific method of changing the assistance amount and the start timing performed by the control condition changer 240 will be explained in detail later. Information about the assistance amount and the start timing associated with the avoidance assistance control, which are changed by the control condition changer 240, may be outputted to the avoidance assistance executor 250. The control condition changer 240 is a specific example of the "changer" in Supplementary Notes described later.

The avoidance assistance executor 250 is configured to perform the avoidance assistance control (i.e., the deceleration control and the steering control) by controlling the operation of each part of the vehicle 10. The avoidance assistance executor 250 may perform the avoidance assistance control, for example, by controlling the operation of a brake actuator and a steering actuator (not illustrated) of the vehicle 10, or the like. The avoidance assistance control herein may be an assistance control that is started from a stage at which the avoidance target is located relatively far, and may be a control that is performed so as not to interfere, for example, with a control of avoiding a collision immediately before the avoidance target (i.e., a pre crash safety (PCS) control). The avoidance assistance executor 250 is a specific example of the "assistor" in Supplementary Notes described later.

Technical Problem

Figure 2:
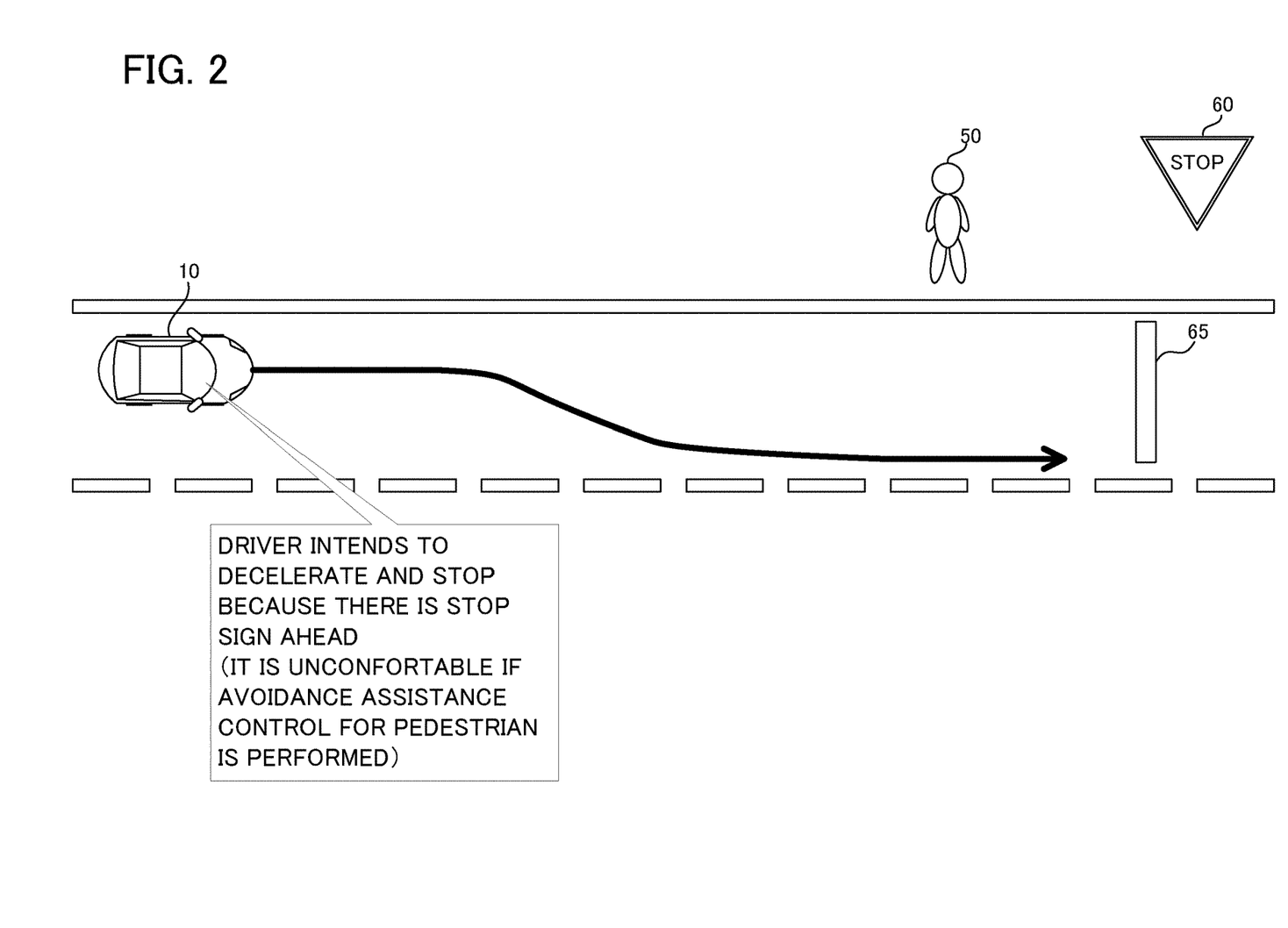
FIG. 2 is a plan view illustrating a technical problem that can occur when there is a deceleration factor, which is different from an avoidance target.

Next, a technical problem that can occur in performing the avoidance assistance control will be explained with reference to FIG. 2. FIG. 2 is a plan view illustrating a technical problem that can occur when there is a deceleration factor, which is different from an avoidance target.

As illustrated in FIG. 2, suppose that a pedestrian 50 as the avoidance target is detected ahead in a distance of travel of the vehicle 10. In this case, in the vehicle 10, the avoidance assistance control for avoiding a collision with the pedestrian 50 is performed. Specifically, the steering control is performed such that a lateral distance to the pedestrian 50 is greater than a predetermined distance (e.g., a distance that is set to safely pass by the pedestrian 50) (refer to a thick solid line in FIG. 2). Moreover, if the steering control cannot ensure an enough room for avoidance, the deceleration control is performed at the same time.

In a situation illustrated in FIG. 2, however, there are a stop sign 60 and a stop line 65 as the deceleration factor, on a far side of the pedestrian 50, as viewed from the vehicle 10. Thus, if the driver of the vehicle 10 recognizes the stop sign 60 and the stop line 65, it is predicted that the driver of the vehicle 10 will perform a deceleration operation for stopping the vehicle 10 near the stop line 65. Then, the avoidance assistance control explained above and the deceleration operation are performed at the same time, and this may cause the driver of the vehicle 10 to feel discomfort. Specifically, if the vehicle 10 is sufficiently decelerated by the deceleration operation, the avoidance assistance control for avoiding a collision with the pedestrian 50 is not necessary (or the assistance amount can be reduced). Then, if the avoidance assistance control is performed as usual, the driver of the vehicle 10 may feel that an unnecessary control is being performed.

As explained above, if there are the avoidance target and the deceleration factor ahead of the vehicle 10, the driver of the vehicle 10 may feel discomfort because the avoidance assistance control is performed. The driving assistance apparatus 200 according to the embodiment is configured to perform an operation explained below (specifically, an operation of changing a condition about the avoidance assistance control depending on the situation) so as to solve the technical problem described above.

<Explanation of Operations>

Figure 3:
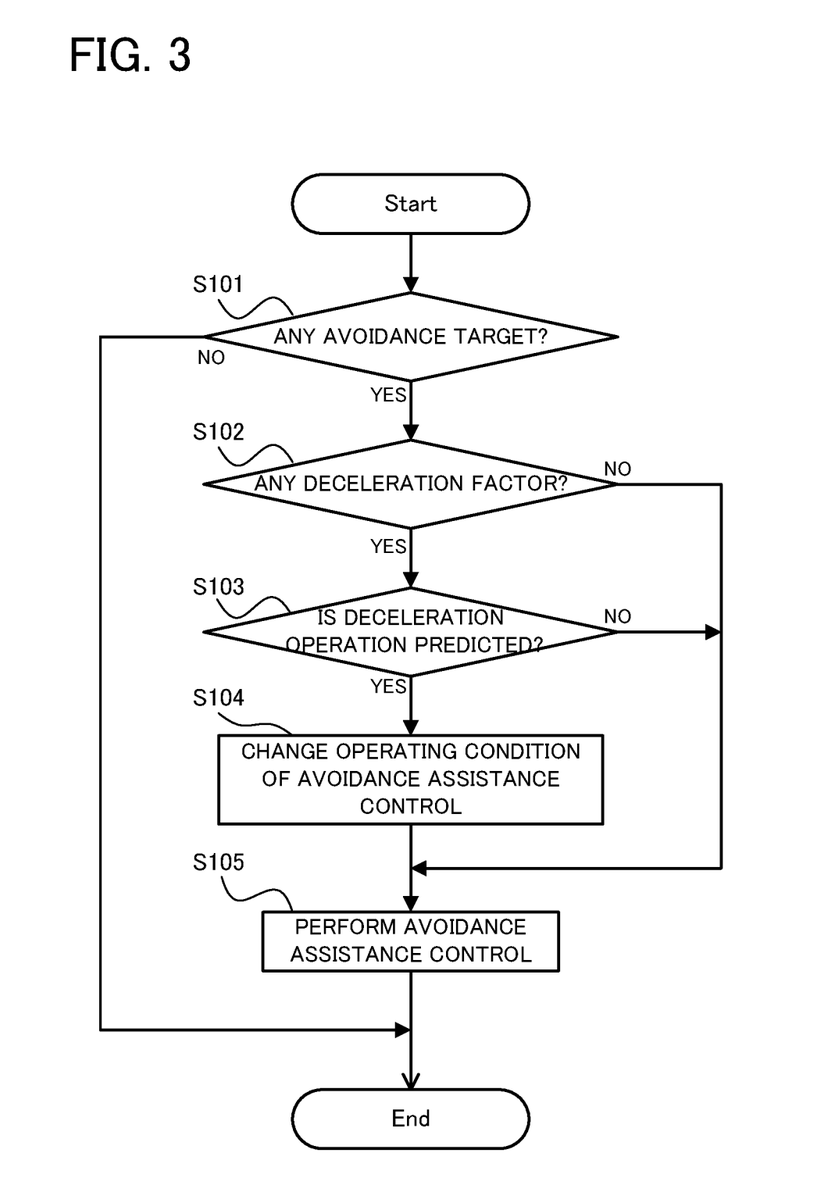
FIG. 3 is a flowchart illustrating a flow of operations of a driving assistance apparatus according to the embodiment.

Next, a flow of operations of the driving assistance apparatus 200 according to the embodiment will be explained with reference to FIG. 3. FIG. 3 is a flowchart illustrating the flow of the operations of the driving assistance apparatus according to the embodiment.

As illustrated in FIG. 3, in operation of the driving assistance apparatus 200 according to the embodiment, the avoidance target detector 210 firstly determines whether or not there is an avoidance target ahead of the vehicle 10 (step S101). If it is determined that there is no avoidance target (the step S101: NO), the subsequent process is omitted, and a series of steps is ended. In this case, the driving assistance apparatus 200 may start the step S101 after a predetermined period.

If it is determined that there is an avoidance target (the step S101: YES), the deceleration factor detector 220 determines whether or not there is a deceleration factor, which is different from the avoidance target located ahead of the vehicle 10 (step S102). If it is determined that there is a deceleration factor (the step S102: YES), the deceleration operation predictor 230 determines whether or not the deceleration operation is to be performed by the driver of the vehicle 10, due to the deceleration factor (step S103). If it is determined that there is no deceleration factor (the step S102: NO), or if it is determined that the deceleration operation is not to be performed (the step S103: NO), the avoidance assistance executor 250 performs the avoidance assistance control in accordance with the detected avoidance target (step S105). In this case, the condition about the avoidance assistance control is not particularly changed, and the avoidance assistance control is performed as usual.

Figure 4:
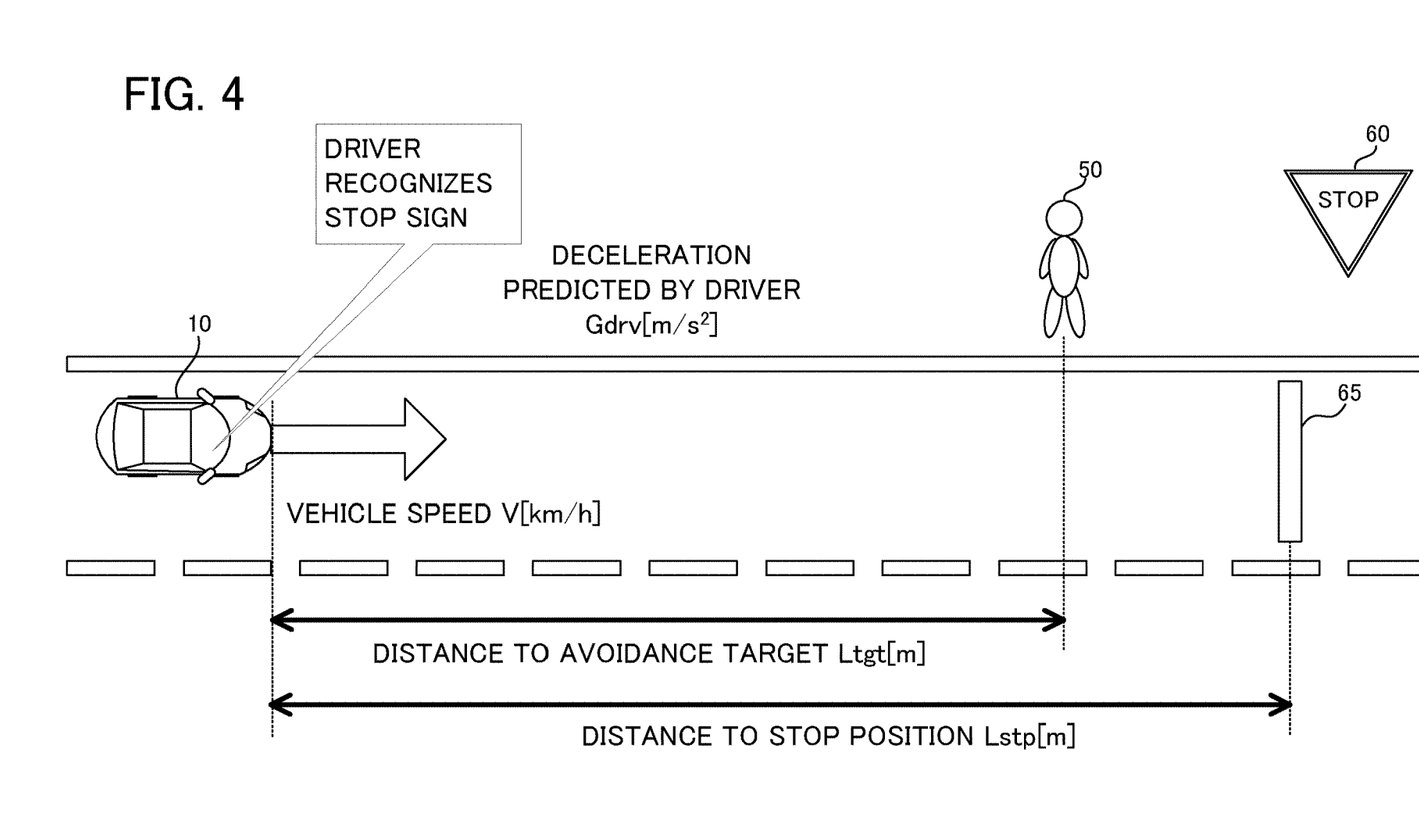
FIG. 4 is a plan view illustrating a method of determining that a deceleration operation caused by a stop line is to be performed.
Figure 5:
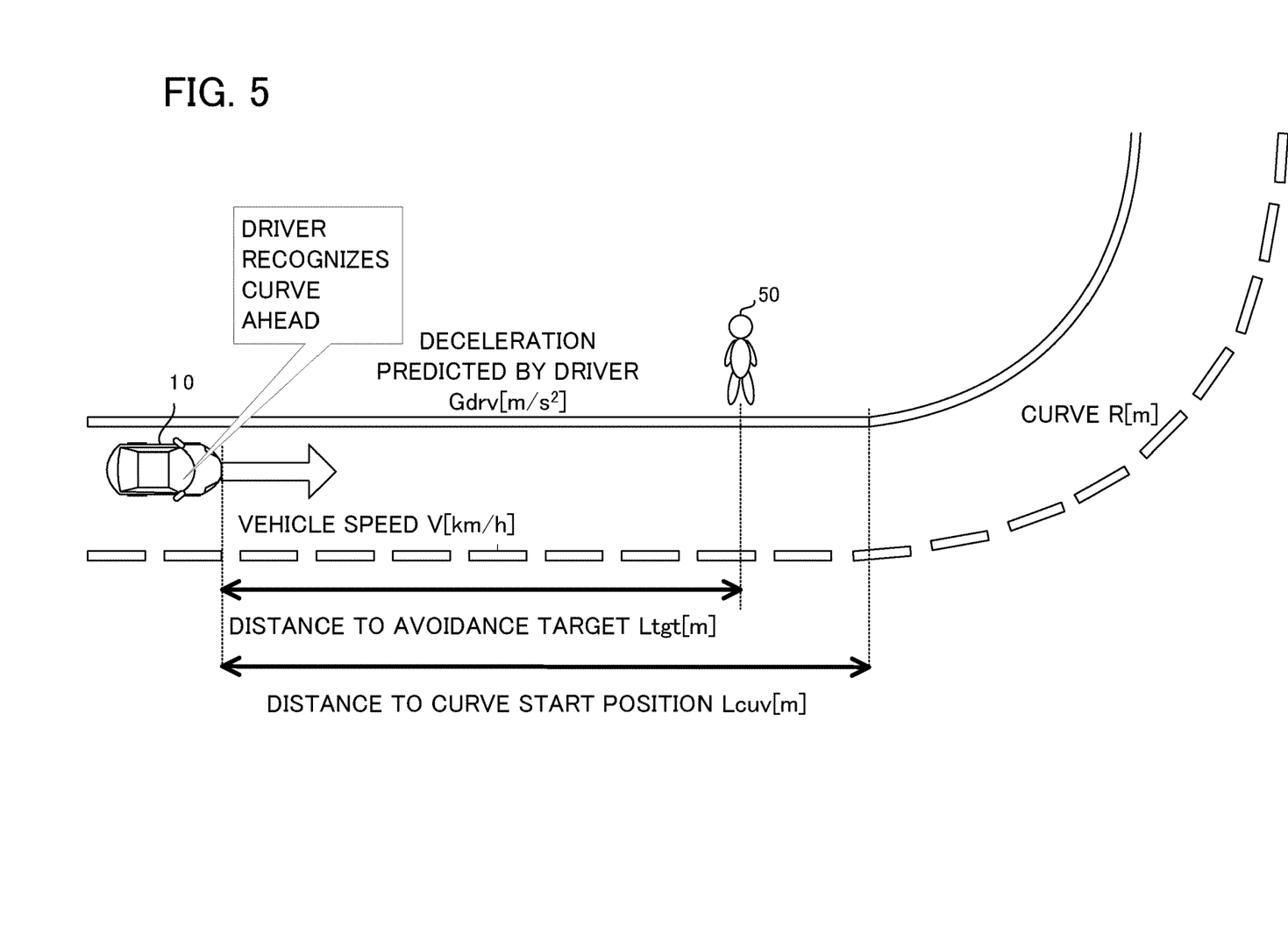
FIG. 5 is a plan view illustrating a method of determining that the deceleration operation caused by a curve located ahead is to be performed.

Now, an example of a method of determining whether or not the deceleration operation is to be performed will be specifically explained with reference to FIG. 4 and FIG. 5. FIG. 4 is a plan view illustrating a method of determining that a deceleration operation caused by a stop line is to be performed. FIG. 5 is a plan view illustrating a method of determining that the deceleration operation caused by a curve located ahead is to be performed.

As illustrated in FIG. 4, suppose that there is a pedestrian 50 ahead of the vehicle 10 as the avoidance target, and there are a stop sign 60 and a stop line 65 as the deceleration factor, on a far side of the pedestrian 50. In this situation, whether or not the driver of the vehicle 10 performs the deceleration operation caused by the deceleration factor can be determined by using the following equation (1). Here, suppose that a vehicle speed of the vehicle 10 is V [km/h], predicted deceleration of the vehicle 10 when the deceleration operation is performed is Gdrv [m/s²], a distance from the vehicle 10 to the avoidance target (i.e., the pedestrian 50) is Ltgt [m], and a distance from the vehicle 10 to a stop position associated with the deceleration factor (i.e., the stop line 65) is Lstp [m].

[Equation 1]

$$Lstp - Ltgt < \frac{(V/3.6)^2}{2 * Gdrv} \tag{1}$$

When the above equation (1) is satisfied, it is determined that the driver of the vehicle 10 performs the deceleration operation caused by the stop sign 60, which is the deceleration factor. On the other hand, when the above equation (1) is not satisfied, it is determined that the driver of the vehicle 10 does not perform the deceleration operation caused by the stop sign 60, which is the deceleration factor.

As illustrated in FIG. 5, suppose that there is a pedestrian 50 ahead of the vehicle 10 as the avoidance target, and there is a curve as the deceleration factor, on a far side of the pedestrian 50. In this situation, whether or not the driver of the vehicle 10 performs the deceleration operation caused by the deceleration factor can be determined by using the following equation (2). Here, suppose that the vehicle speed of the vehicle 10 is V [km/h], the predicted deceleration of the vehicle 10 when the deceleration operation is performed is Gdrv [m/s²], the distance from the vehicle 10 to the avoidance target (i.e., the pedestrian 50) is Ltgt [m], a distance from the vehicle 10 to the curve, which is the deceleration factor, is Lcuv [m], and the vehicle speed of the vehicle 10 in the curve is Vcuv [km/h].

[Equation 2]

$$Lcuv - Ltgt < \frac{(V/3.6)^2 - (Vcuv/3.6)^2}{2 * Gdrv} \tag{2}$$

When the above equation (2) is satisfied, it is determined that the driver of the vehicle 10 performs the deceleration operation caused by the curve ahead, which is the deceleration factor. On the other hand, when the above equation (2) is not satisfied, it is determined that the driver of the vehicle 10 does not perform the deceleration operation caused by the curve ahead, which is the deceleration factor. The vehicle speed Vcuv in the curve can be calculated from the following equation (3) by using a radius R [m] of the curve. Here, Gcuv indicates lateral acceleration allowed by the driver during curve driving, and is said to be approximately 0.2× 9.8 [m/s²].

[Equation 3]

$$Vcuv = 3.6 \times \sqrt{R \times Gcuv} \tag{3}$$

The method of obtaining the vehicle speed Vcuv during curve driving, which uses the above equation (3), is merely an example, and Vcuv may be obtained, for example, by recognizing a speed sign or the like placed near the curve.

Back in FIG. 3, if it is determined that the deceleration operation is to be performed by the driver of the vehicle 10 (the step S103: YES), the control condition changer 240 changes an operating condition associated with the avoidance assistance control (specifically, at least one of the assistance amount and the start timing) (step S104). In this case, the avoidance assistance executor 250 performs the avoidance assistance control on the basis of the condition changed by the control condition changer 240 (step S105).

Figure 6:
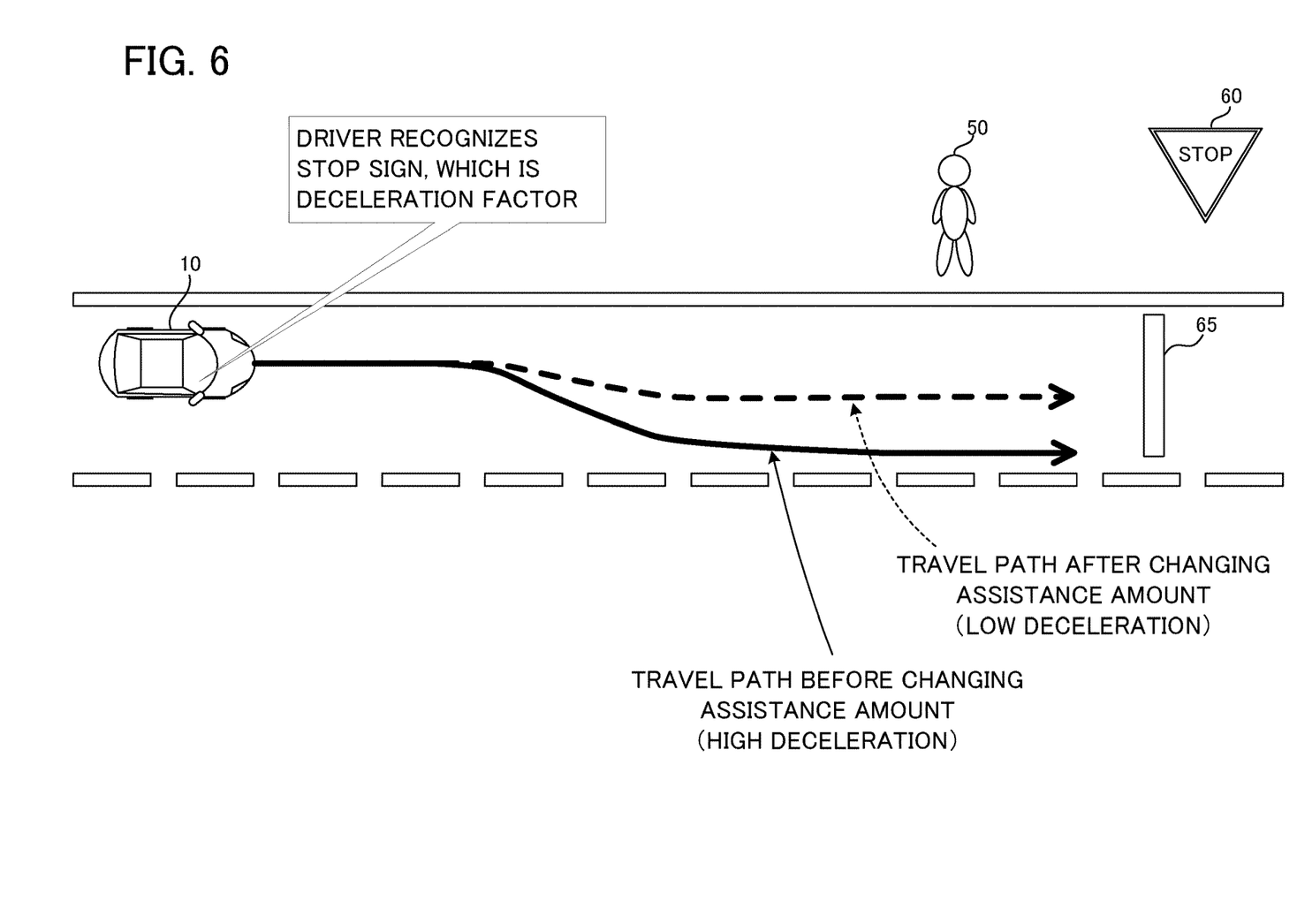
FIG. 6 is a plan view illustrating an example of a process of reducing an assistance amount of an avoidance assistance control.
Figure 7:
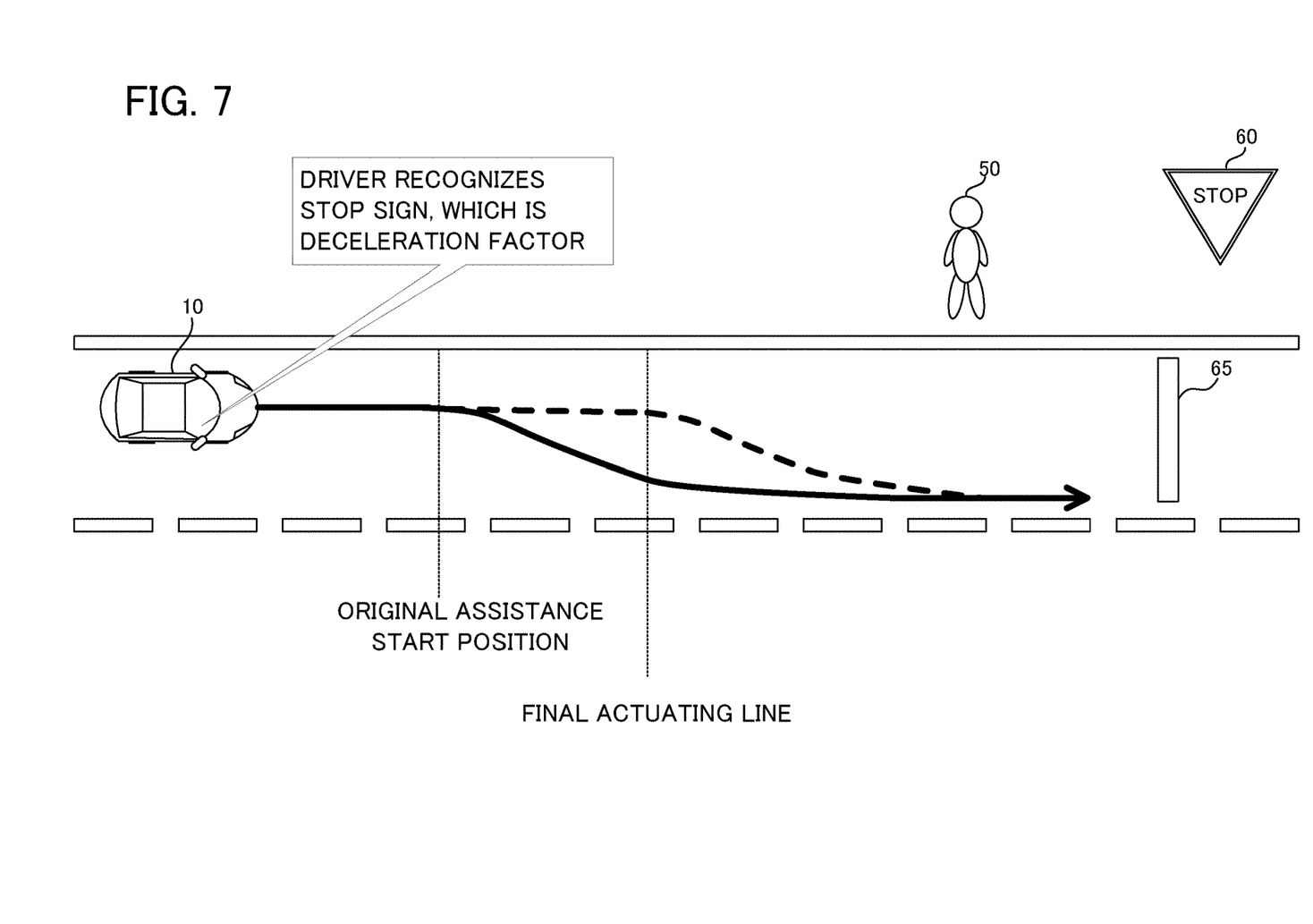
FIG. 7 is a plan view illustrating an example of a process of delaying start timing of the avoidance assistance control.

Now, changing the condition of the avoidance assistance control will be specifically explained with reference to FIG. 6 and FIG. 7. FIG. 6 is a plan view illustrating an example of a process of reducing the assistance amount of the avoidance assistance control. FIG. 7 is a plan view illustrating an example of a process of delaying the start timing of the avoidance assistance control. Hereinafter, an explanation will be given to the situation in which there are the stop sign 60 and the stop line 65 ahead of the vehicle 10, which is illustrated in FIG. 4.

As illustrated in FIG. 6, in the case of changing the assistance amount associated with the avoidance assistance control, the control condition changer 240 may perform a process of reducing the deceleration amount in accordance with the steering amount of the avoidance assistance control and a situation, in comparison with those when it is not determined that the deceleration operation is to be performed by the driver of the vehicle 10. By this, in a travel path of the vehicle 10 after changing the assistance amount, a movement amount in a lateral direction (i.e., a movement in a direction away from the pedestrian 50) is less than those in a travel path of the vehicle 10 before changing the assistance amount. Moreover, the deceleration of the vehicle 10 after changing the assistance amount is less than those before changing the assistance amount.

A specific value of the assistance amount after the change can be determined, for example, on the basis of a "predicted speed V' in passing the avoidance target (or specifically, a vehicle speed when the vehicle 10, which is decelerated by the deceleration operation by the driver, passes by the avoidance target)", which can be calculated from a relative positional relation between the avoidance target (i.e., the pedestrian 50) and the stop position as the deceleration factor (i.e., the stop line 65). For example, a value of the steering amount of the avoidance assistance control after the change may be determined on the basis of a safety margin distance corresponding to the predicted speed V' in passing the avoidance target (i.e., a lateral distance that allows the vehicle to safely pass by the avoidance target). Moreover, a value of the deceleration amount of the avoidance assistance control after the change may be determined on the basis of a difference between the predicted speed V' in passing the avoidance target and a target speed in passing the avoidance target (i.e., a speed that allows the vehicle to safely pass by the avoidance target).

As illustrated in FIG. 7, in the case of changing the start timing associated with the avoidance assistance control, the control condition changer 240 may perform a process of delaying the start timing of the avoidance assistance control, in comparison with those when it is not determined that the deceleration operation is to be performed by the driver of the vehicle 10. Specifically, the control condition changer 240 may set a "final actuating line" in a position that is closer to the avoidance target than an assistance start position corresponding to the original start timing. In this case, the avoidance assistance control is started at a time at which the vehicle 10 reaches the final actuating line. The final actuating line may be set in a position in which even if the driver does not perform the deceleration operation (i.e., even if the driver actually does not perform the deceleration operation even in a situation in which it is predicted that the driver will perform the deceleration operation), the avoidance assistance control is started from the final actuating line, so that a collision with the avoidance target can be appropriately avoided.

Technical Effect

Next, a technical effect obtained by the driving assistance apparatus 200 according to the embodiment will be explained.

As explained by using FIG. 1 to FIG. 7, according to the driving assistance apparatus 200 in the embodiment, when there is a deceleration factor, which is different from the avoidance target, ahead of the vehicle 10, the avoidance assistance control is performed in view of the deceleration operation caused by the deceleration factor. It is thus possible to prevent the driver of the vehicle 10 from feeing discomfort. In other words, it is possible to prevent the driver of the vehicle 10 from feeling that the deceleration control and the steering control are being unnecessarily performed because an inappropriate avoidance assistance control is performed.

Modified Example

The aforementioned embodiment is designed under the assumption that the driver of the vehicle 10 performs the deceleration operation when there is a deceleration factor. Instead of or in addition to the deceleration operation performed by the driver of the vehicle 10, however, it is also possible to consider a deceleration control that can be performed by another system other than the driving assistance apparatus 200. For example, if the vehicle 10 is provided with a system that is configured to detect the presence of a deceleration factor and to automatically perform the deceleration control, then, the deceleration operation predictor 230 may also predict whether or not the deceleration control by this another system will be performed. If it is predicted that the deceleration control by this another system will be performed, the control condition changer 240 may be configured to change at least one of the assistance amount and the start timing of the avoidance assistance control.

<Supplementary Notes>

Various aspects of embodiments of the present disclosure derived from the embodiment explained above will be explained hereinafter.

(Supplementary Note 1)

A driving assistance apparatus described in Supplementary Note 1 is provided with: an assistor configured to perform an avoidance assistance control when there is a target to avoid, ahead of a vehicle, so as to avoid a collision between the vehicle and the target; a predictor configured to predict that a deceleration operation of the vehicle will be performed, on the basis of a deceleration factor, which is different from the target and which is located in surroundings of the vehicle, when there is the target ahead of the vehicle; and a changer configured in such a manner that when it is predicted that the deceleration operation will be performed, the changer performs at least one of a process of reducing an assistance amount associated with the avoidance assistance control and a process of delaying start timing of the avoidance assistance control, in comparison with those when it is not predicted that the deceleration operation will be performed.

When there is the deceleration factor (e.g., a stop line, etc.), which is different from the target of the avoidance assistance control (e.g., a pedestrian, etc.), supposedly, the speed of the vehicle may be reduced by performing the deceleration operation of the vehicle. In this situation, if the avoidance assistance control (e.g., the steering control and the deceleration control) is performed as usual, a driver of the vehicle may feel discomfort. In other words, the driver of the vehicle may feel that the deceleration control and the steering control are unnecessarily performed.

According to the driving assistance apparatus described in Supplementary Note 1, however, if it is predicted that the deceleration operation will be performed apart from the avoidance assistance control, the changer may perform at least one of the process of reducing the assistance amount associated with the avoidance assistance control and the process of delaying the start timing of the avoidance assistance control, in comparison with those when it is not predicted that the deceleration operation will be performed. By this, the avoidance assistance control is performed in a milder manner (or the assistance amount is set to zero and the execution of the avoidance assistance control is substantially prohibited), and it is thus possible to prevent the driver of the vehicle from feeling discomfort.
(Supplementary Note 2)

In a driving assistance apparatus described in Supplementary Note 2, the predictor is configured to predict that the deceleration operation will be performed by a driver of the vehicle, on the basis of the deceleration factor.

When the deceleration operation is performed by the driver of the vehicle, the driver easily feels discomfort if the avoidance assistance control is performed as usual. More specifically, the driver easily feels that the avoidance assistance control is unnecessary because the avoidance assistance control is performed even though the driver intends to perform the deceleration operation. Therefore, when it is predicted that the deceleration operation will be performed by the driver, the technical effect of preventing the driver from feeling discomfort may be demonstrated, more effectively.

The present disclosure may be embodied in other specific forms without departing from the spirit or characteristics thereof. The present embodiments and examples are therefore to be considered in all respects as illustrative and not restrictive, the scope of the disclosure being indicated by the appended claims rather than by the foregoing description and all changes which come in the meaning and range of equivalency of the claims are therefore intended to be embraced therein.

What is claimed is:

1. A driving assistance apparatus comprising:
an assistor configured to perform an avoidance assistance control when there is a target to avoid, ahead of a vehicle, so as to avoid a collision between the vehicle and the target;
a predictor configured to predict that a deceleration operation of the vehicle will be performed, on the basis of a deceleration factor, which is different from the target and which is located in surroundings of the vehicle, when there is the target ahead of the vehicle; and
a changer configured in such a manner that when it is predicted that the deceleration operation will be performed, said changer performs at least one of a process of reducing an assistance amount associated with the avoidance assistance control and a process of delaying start timing of the avoidance assistance control, in comparison with those when it is not predicted that the deceleration operation will be performed.

2. The driving assistance apparatus according to claim 1, wherein said predictor is configured to predict that the deceleration operation will be performed by a driver of the vehicle, on the basis of the deceleration factor.

* * * * *